(12) United States Patent
DesRosier et al.

(10) Patent No.: US 6,792,563 B1
(45) Date of Patent: Sep. 14, 2004

(54) METHOD AND APPARATUS FOR BUS ACTIVITY TRACKING

(75) Inventors: Peter J. DesRosier, Portland, OR (US); Dan W. Patterson, Sunnyvale, CA (US); Vikram Gupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/561,845

(22) Filed: Apr. 28, 2000

(51) Int. Cl.[7] .................................................. G06F 11/00
(52) U.S. Cl. ........................................................ 714/43
(58) Field of Search ................................ 714/37, 39, 43, 714/45, 49, 30

(56) References Cited

U.S. PATENT DOCUMENTS

| | | | | |
|---|---|---|---|---|
| 4,758,949 A | * | 7/1988 | Wada et al. ................. 712/208 |
| 5,206,948 A | * | 4/1993 | De Angelis et al. .......... 714/45 |
| 5,564,041 A | * | 10/1996 | Matsui et al. ................. 703/23 |
| 5,571,942 A | * | 11/1996 | Hoechstetter et al. ....... 564/428 |
| 6,016,544 A | * | 1/2000 | Henry et al. ................. 712/234 |
| 6,189,140 B1 | * | 2/2001 | Madduri ..................... 717/128 |
| 6,311,292 B1 | * | 10/2001 | Choquette et al. ............ 714/30 |
| 6,615,369 B1 | * | 9/2003 | Beck et al. .................... 714/39 |
| 6,615,370 B1 | * | 9/2003 | Edwards et al. .............. 714/45 |

* cited by examiner

*Primary Examiner*—Robert Beausoliel
*Assistant Examiner*—Bryce P. Bonzo
(74) *Attorney, Agent, or Firm*—Schwegman, Lundberg, Woessner & Kluth, P.A.

(57) ABSTRACT

An electronic component for failure detection and analysis of bus activity comprises configuration circuitry, a buffer, and read circuitry. The configuration circuitry, the buffer, the read circuitry and the bus being tracked are on the same die. The configuration circuitry identifies one or more modes, one or more triggers, and one or more responses associated with the triggers. The buffer stores transactions on a bus according to the configuration circuitry. The read circuitry reads data from the buffer. A method of tracking bus activity comprises configuring a bus activity tracking component; monitoring an interface for a trigger event; and performing associated responses upon the occurrence of the trigger event.

38 Claims, 12 Drawing Sheets

|  | BITS | DESCRIPTION OF CONFIGURATION REGISTER BITS |
|---|---|---|
| MODE FIELD | 0 | HISTORY BUFFER ENABLE; ENABLE'S CLOCKING OF THE BUFFER WHEN SET. DEFAULT IS 0 = (DISABLED). ALSO ENABLES FREEZING THE BUFFER IF A TRIGGER EVENT OCCURS. |
|  | 1 | EVENT/CLOCK GRANULARITY MODE (CAPTURES DATA AS EVENTS OR AS CONSECUTIVE CLOCKS OF DATA) |
|  | 2 | BIT 1 = 0 (EVENT MODE): STORES EVENTS BEFORE (0) OR AFTER (1) THE TRIGGER. BIT = 1 (CLOCK MODE): STORES ADDRESS INFORMATION FROM THE BBL (0) OR L2 (1). |
|  | 3 | CADS GRANULARITY MODE (INCREMENTS COUNTER EVERY CLOCK OR EVERY 4TH CLOCK) |
|  | 4 | SIGNAL A TAP MICRO-BREAKPOINT ON A TRIGGER CONDITION. |
|  | 5 | TAP MICRO BrkPt RE-TRIGGER MODE BIT. WHEN SET, A TAP MICRO BREAKPOINT IS SIGNALED EVERY TIME A TRIGGER CONDITION OCCURS. WHEN "0", A TAP MICRO BREAKPOINT IS SIGNALED ONLY ONCE. |
| TRIGGER FIELD | 6 | TRIGGER ON A TAP MICRO BREAKPOINT. |
|  | 7 | TRIGGER ON AN ECC ERROR. |
|  | 8 | TRIGGER ON AN L2 ERROR INDICATION. |
|  | 9 | TRIGGER ON AN ADDRESS MATCH |
|  | 10 | TRIGGER ON A UOP MATCH. |
|  | 11 | TRIGGER ON A TAG HIT. |
|  | 12 | TRIGGER ON AN (ADDRESS AND UOP) MATCH. |
|  | 13 | TRIGGER ON AN (ADDRESS AND TAG HIT) MATCH. |
|  | 14 | TRIGGER ON A BBL EVENT. |
|  | 15 | USER-INDUCED TRIGGER (SETTING THIS BIT TO A 1 CAUSES A TRIGGER). |
|  | [17:16] | RESERVED TRIGGER BITS. |
| INDEX FIELD | [20:18] | INDEX INTO HISTORY BUFFER USED FOR READING HISTORY BUFFER ONTO THE ZCRDATA BUS. |
|  | [22:21] | RESERVED INDEX BIT (ALLOWS EXTENSION OF BUFFER DEPTH IF DIE SIZE ALLOWS). |
| RESPONSE FIELD | [25:23] | RESERVED RESPONSE BITS. |
|  | 26 | INDICATES BUFFER IS FROZEN. BUFFER CAN BE UNLOCKED FROM ITS FROZEN STATE BY WRITING A '0' TO THIS BIT. |
| POINTER FIELD | [29:27] | HEAD POINTER. |
|  | [31:30] | RESERVED HEAD POINTER BIT (ALLOWS EXTENSION OF BUFFER DEPTH IF DIE SIZE ALLOWS). |

FIG. 12A

| BITS | DESCRIPTION MATCH REGISTER BITS |
|---|---|
| [1:0] | RESERVED. |
| [4:2] | UOP TO BE MATCHED. |
| [31:5] | BITS 31:5 OF THE ADDRESS TO BE MATCHED. |

FIG. 12B

| BITS | DESCRIPTION MASK REGISTER BITS |
|---|---|
| [4:0] | RESERVED. |
| [31:5] | MASK BITS FOR BITS [31:5] OF THE ADDRESS TO BE MATCHED. |

FIG. 12C

METHOD AND APPARATUS FOR BUS ACTIVITY TRACKING

TECHNICAL FIELD OF THE INVENTION

The present invention relates generally to failure analysis techniques for processors and, in particular, the present invention relates to bus activity tracking.

BACKGROUND

In the race to design higher performing and lower cost computers, processor designers have been making improvements in hardware components. As the number of transistors has increased from hundreds to millions, the speed and complexity of processors have increased, thereby increasing the probability of errors. Besides increasing integration, computer architecture has become more varied and creative over the years. In creating new architecture designs, sometimes the designer merges two separate electronic components together into one electronic component. When this happens, an interface between the two electronic components—once visible for test purposes—becomes hidden inside the single electronic component. When visibility is lost, errors in transactions over the interface become very difficult to debug.

For example, moving a cache onto the same die can decrease processor cache access time and is thus a desirable new design. In the old design, the bus between the cache and processor was debugged using a logic analyzer. In the new design with the cache inside the processor component, a logic analyzer can no longer reach the bus because the bus is inside a single component. Consequently, any error that occurs while using the cache is hidden and invisible, forcing the user (also referred to herein as a "debugger") to rely on scant evidence from outside the component to make indirect inferences about the possible sources of the error. Furthermore, in the case of marginal failures, the failure must be reproduced for each test, but replicating the specific conditions leading to a marginal failure is difficult at best, especially when those conditions are invisible. Therefore, the user (debugger) has no hard data and only hunches and hypotheses about where an error may be occurring and what is literally occurring on the bus. Yet, hunches and hypotheses often waste valuable time and eventually lead to dead ends without a way to directly observe the function of the bus. In short, the user (debugger) needs a precise tool to observe bus traffic in order to diagnose and debug errors in bus activity efficiently. Quick failure analysis turnaround is necessary to support high-volume semiconductor manufacturing, where annual processor production volume is in the range of tens of millions of units.

BRIEF DESCRIPTION OF THE DRAWINGS

FIG. 12A is a table illustrating the contents of a configuration register according to an example embodiment of the present invention.

FIG. 12B is a table illustrating the contents of a match register according to an example embodiment of the present invention.

FIG. 12C is a table illustrating the contents of a mask register according to an example embodiment of the present invention.

DETAILED DESCRIPTION

Figure 1:
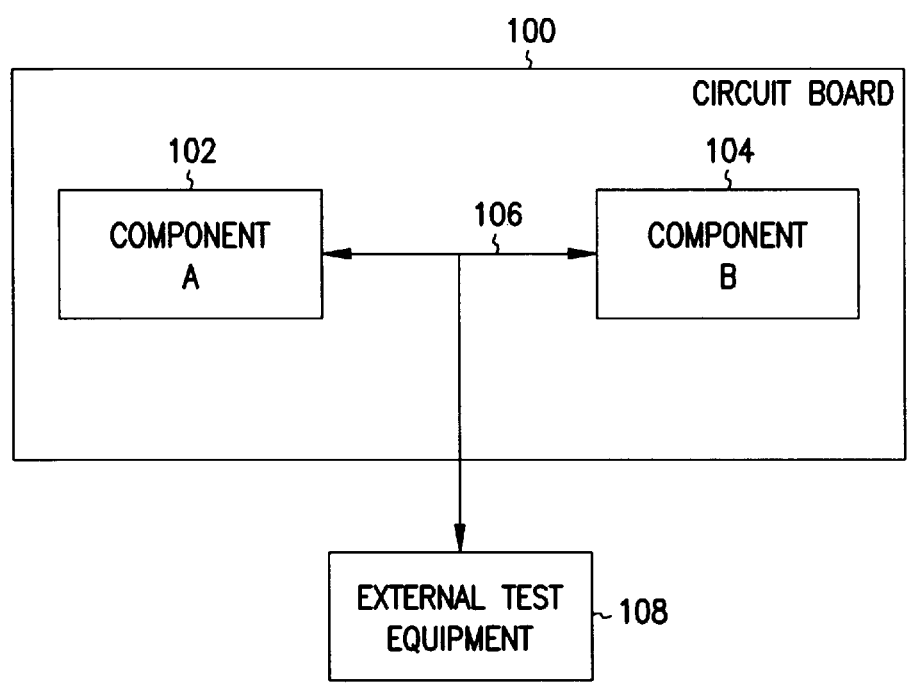
FIG. 1 is a block diagram of external test equipment and an interface to be tested according to previous methods.

In the following detailed description of the invention reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

In previous systems, test equipment external to a computer system was required to view, test, and debug traffic on a bus within the computer system during the design process. FIG. 1 is a block diagram of previously used test equipment and an interface to be tested. As shown in FIG. 1, a circuit board 100 contains two electronic components, electronic component A 102 and electronic component B 104, which are connected by an interface 106, such as a bus. The interface 106 is accessible by external test equipment 108, such as a logic analyzer, that is not located on the circuit board 100. External test equipment 108 is external to the computer system and is used to debug traffic on the interface 106.

Figure 2:
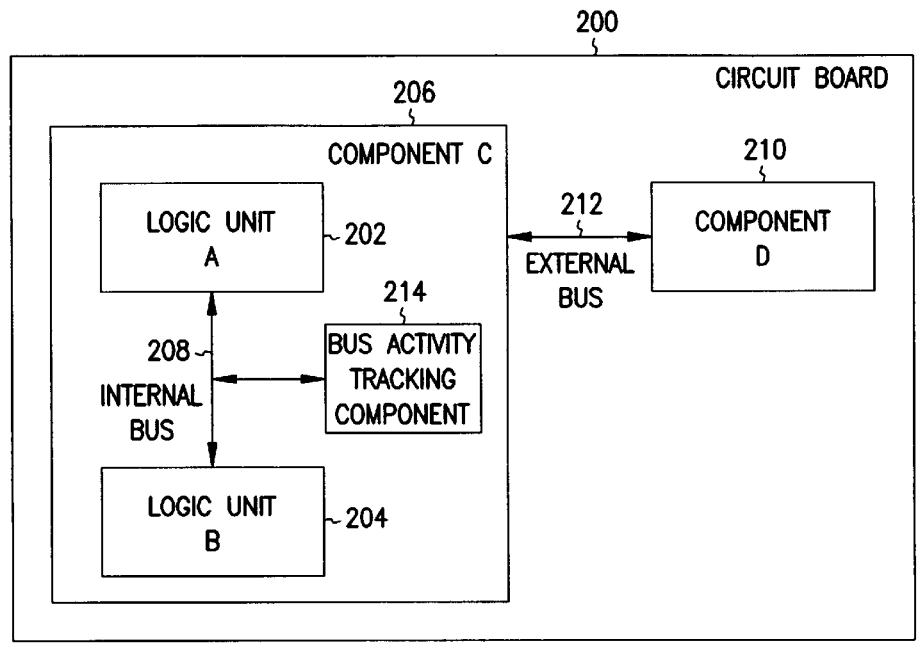
FIG. 2 is a block diagram of a bus activity tracking component according to one embodiment of the invention.

Unlike the previous system shown in FIG. 1, the present invention tracks interfaces that are not accessible with external test equipment. FIG. 2 is a block diagram of a bus activity tracking component 214 according to one embodiment of the invention. In FIG. 2, the circuit board 200 contains logic unit A 202 and logic unit B 204 inside electronic component C 206. Also, inside electronic component C is an interface 208, such as an internal bus, connecting logic unit A 202 and logic unit B 204. The interface 208 is not accessible by external test equipment because it is contained inside electronic component C 206. In contrast, an interface 212, such as an external bus, between electronic component C 206 and electronic component D 210 on circuit board 200 is accessible by external test equipment. Thus, the interface 212 in FIG. 2 is analogous to the interface 106 in FIG. 1. In one embodiment, the bus activity tracking component 214 tracks the interface 208 that is otherwise inaccessible by external test equipment.

In an alternate embodiment, the bus activity tracking component 214 of FIG. 2 can also access interfaces that are accessible by external test equipment. In this embodiment, the external bus interface 212 can be monitored not only by external test equipment but also by the bus activity tracking component 214 that is part of electronic component C 206.

Figure 3:
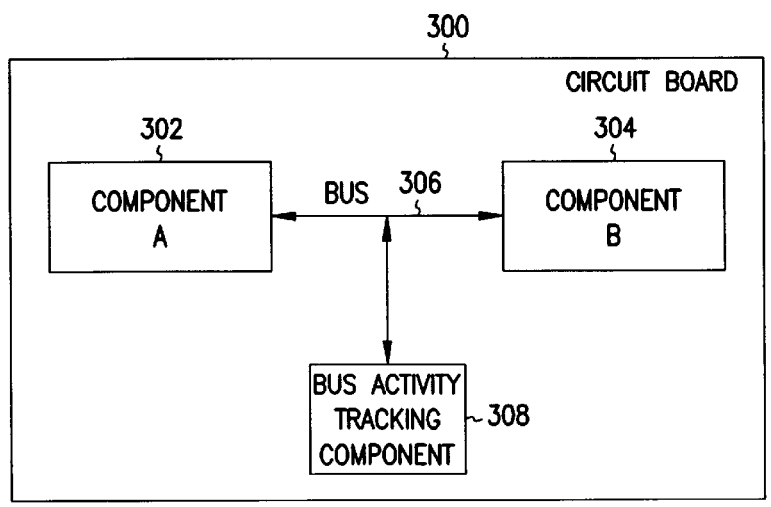
FIG. 3 is a block diagram of a bus activity tracking component according to an alternate embodiment of the invention.

FIG. 3 is a block diagram of a further embodiment of a bus activity tracking component 308. The bus activity tracking component 308 can access interfaces that are also available to external test equipment. Like FIG. 1, the circuit board 300 in FIG. 3 contains electronic component A 302 and electronic component B 304 connected by an interface 306. But now, the interface 306 is accessible not only by external test equipment but also by the bus activity tracking component 308. In an example embodiment implementing the bus activity tracking component 308 as a stand alone die, the bus activity tracking component 308 also comprises circuitry to control the bus activity tracking component 308. The control circuitry allows a user to read from and write to the registers in the bus activity tracking component in order to configure the bus activity tracking component 308. However, the bus activity tracking component 308, shown in FIG. 3, resides on the circuit board 300 while the external test equipment 108, shown in FIG. 1, does not.

Figure 4:
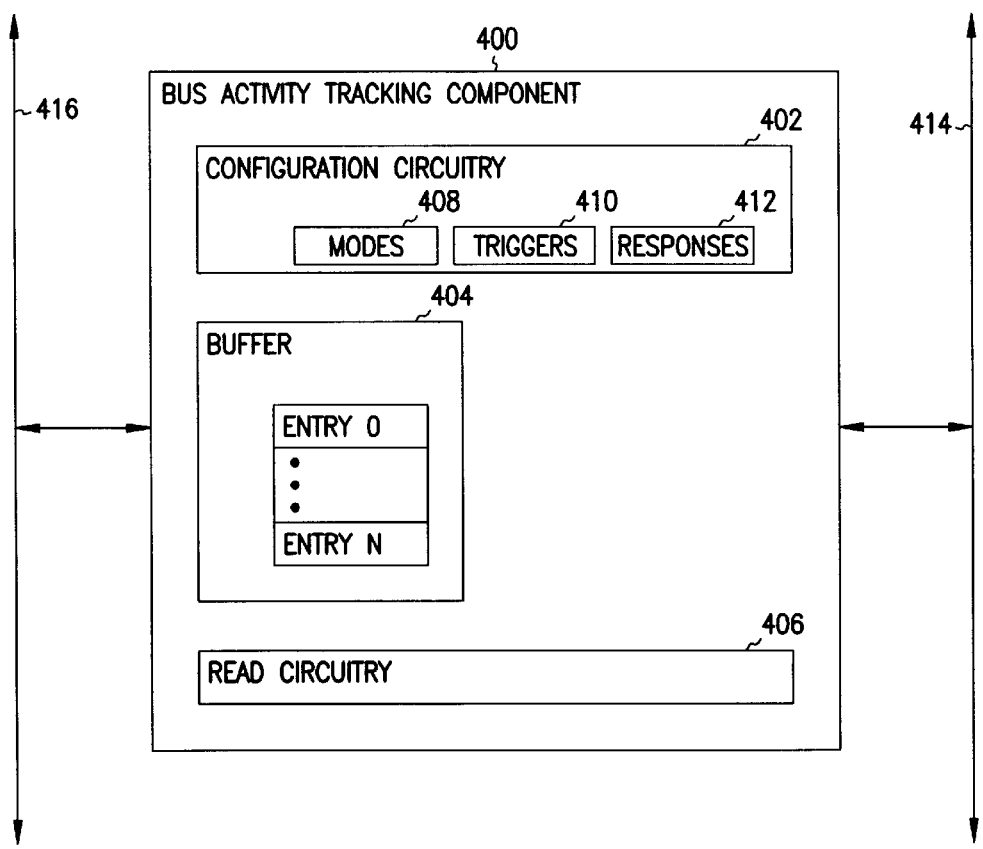
FIG. 4 is a detailed block diagram of an example embodiment of a bus activity tracking component.

FIG. 4 is a detailed block diagram of a bus activity tracking component 400, according to one embodiment of the present invention. The bus activity tracking component 400 is connected to a first bus 414 and a second bus 416. In one embodiment, the bus activity tracking component 400 monitors bus transactions on the first bus 414 and sends and receives information over the second bus 416. Bus transactions are comprised of data and control signals asserted on a bus or other interface. The bus activity tracking component 400 and the first bus 414, which is being tracked by the bus activity tracking component 400, are both located on the same die. A "die" is a chip, such as a processor. The chip manufacturing process starts by slicing a silicon ingot into wafers, where each wafer is further processed to create wafers patterned with many copies of the chip. A wafer is then diced into individual "dies" containing one chip each.

In the embodiment shown in FIG. 4, the bus activity tracking component 400 comprises configuration circuitry 402, a buffer 404, and read circuitry 406. Each of these elements is described in detail below.

The configuration circuitry 402 defines the parameters under which the bus activity tracking component 400 operates. In one embodiment, the configuration circuitry 402 identifies one or more modes 408, one or more triggers 410, and one or more responses 412 associated with the triggers 410. Defining modes 408, triggers 410, and responses 412 creates a wide range of testing options to choose from depending on the testing objective. Various embodiments of a bus activity component 400 are created by selecting different modes 408, triggers 410, and responses 412. See FIG. 12A, described below, for an example of the contents of a configuration register, according to one embodiment of the present invention.

Modes 408 are settings for the bus activity tracking component that define how the bus activity tracking component 400 captures data. In one embodiment, the modes 408 include, but are not limited to, one or more of the following: whether the buffer 404 is enabled or disabled; whether data is captured as a series of events or by consecutive clocks; the frequency of data capture; whether data is captured before or after the trigger 410; and whether and when to signal external debug equipment or additional internal debug features. If a mode 408 indicates that the buffer 404 is enabled, then test data and control signals on the bus being monitored are captured during operation and stored in the buffer 404. But, if the mode 408 indicates that the buffer 404 is disabled, then no data or control signals on the bus being monitored are stored in the buffer 404. If a mode 408 indicates data is captured as a series of events, then during operation the events are stored in the buffer 404. An event refers to a transaction sequence on the interface. For example, an L2 cache micro-operation such as a tag read or a tag write would be an example of an event. On the other hand, if a mode 408 indicates data is captured by consecutive clocks, then data or control signals on the bus being monitored are stored in the buffer 404 at each consecutive clock tick. A clock tick (also known as tick, clock, clock period, and clock cycle) is the time for one clock period of the processor clock that runs at a constant rate and is used to measure the speed at which hardware can perform basic functions.

Another mode 408 defines how often to increment a counter that is used to keep track of how far apart events are occurring on the interface. Still another mode 408 indicates whether data is captured before or after a trigger 410 allowing flexibility for those cases where a convenient trigger condition occurs either before or after the transactions for which the user needs to capture bus activity data in the buffer 404. Another mode 408 sets a predefined amount of data to capture before or after a trigger 410. Still another mode 408 indicates whether to signal the external debug equipment and if so, when to signal such equipment. For example, the bus activity tracking component 400 may do any of the following: send a signal only the first time a trigger 410 occurs, send a signal every time a trigger 410 occurs, never send a signal, or send a signal under more complicated conditions.

Triggers 410, as part of the configuration circuitry 402 shown in FIG. 4, define when a response 412 will occur during operation of the bus activity tracking component 400. For example, if a trigger 410 is defined as an address and the bus activity tracking component 400 observes that address, then the bus activity tracking component 400 performs the response 412 associated with the trigger 410. Examples of triggers 410 include, but are not limited to, one or more of the following: an address, a micro-operation, a signal from external debug equipment, a predefined hardware component error signal, a predefined interface error signal, an error correcting code (ECC) error, a cache hit or miss, a user-induced trigger, and other events occurring on an interface. A user-induced trigger is caused by setting a predefined register or bit in the configuration circuitry 402 to a value that causes a trigger 410. In one embodiment, a user-induced trigger is used when there is no convenient trigger 410 near the pertinent bus traffic at issue in the test. In another embodiment, user-induced triggers are set by external debug equipment.

Responses 412, as part of the configuration circuitry 402 shown in FIG. 4, are associated with the triggers 410. As described above, the bus activity tracking component 400 operates according to the predefined modes 408 and performs one or more predefined responses 412 upon the occurrence of a predefined trigger 410. Examples of responses 412 include, but are not limited to, signaling external debug equipment, storing test data in the buffer 404, locking the buffer 404, and unlocking the buffer 404. When the buffer 404 is locked, no additional test data is stored in the buffer 404, until it is unlocked. The buffer 404 is locked upon completion of a test to enable the read circuitry 406 to read the test data stored there. Also, locking the buffer 404 prevents storing superfluous test data and overwriting valuable test data.

A buffer 404 stores the test data captured by the bus activity tracking component 400, during operation, according to the configuration circuitry 402. The present invention is not limited to any one implementation of a buffer. FIG. 4 shows a buffer 404 with 0, 1, 2 . . . n entries, for a total of n+1 entries. The configuration circuitry 402 includes at least one pointer to the buffer 404. In one embodiment, the at least one pointer to the buffer may be located in a different place in the bus activity tracking component 400.

Read circuitry 406 reads test data out of the buffer 404 and makes the test data available to the second bus 416. The second bus 416 is a control bus. The second bus 416 is available to external test equipment and other components located on or off the die. Like a buffer 404, read circuitry 406 is not limited to any particular implementation. In one embodiment, the buffer 404, when locked, is read by the read circuitry 406 using at least one pointer to the buffer 404 in the configuration circuitry 402. However, in another embodiment, at least one pointer is located in a different place in the bus activity tracking component 400.

Figure 5:
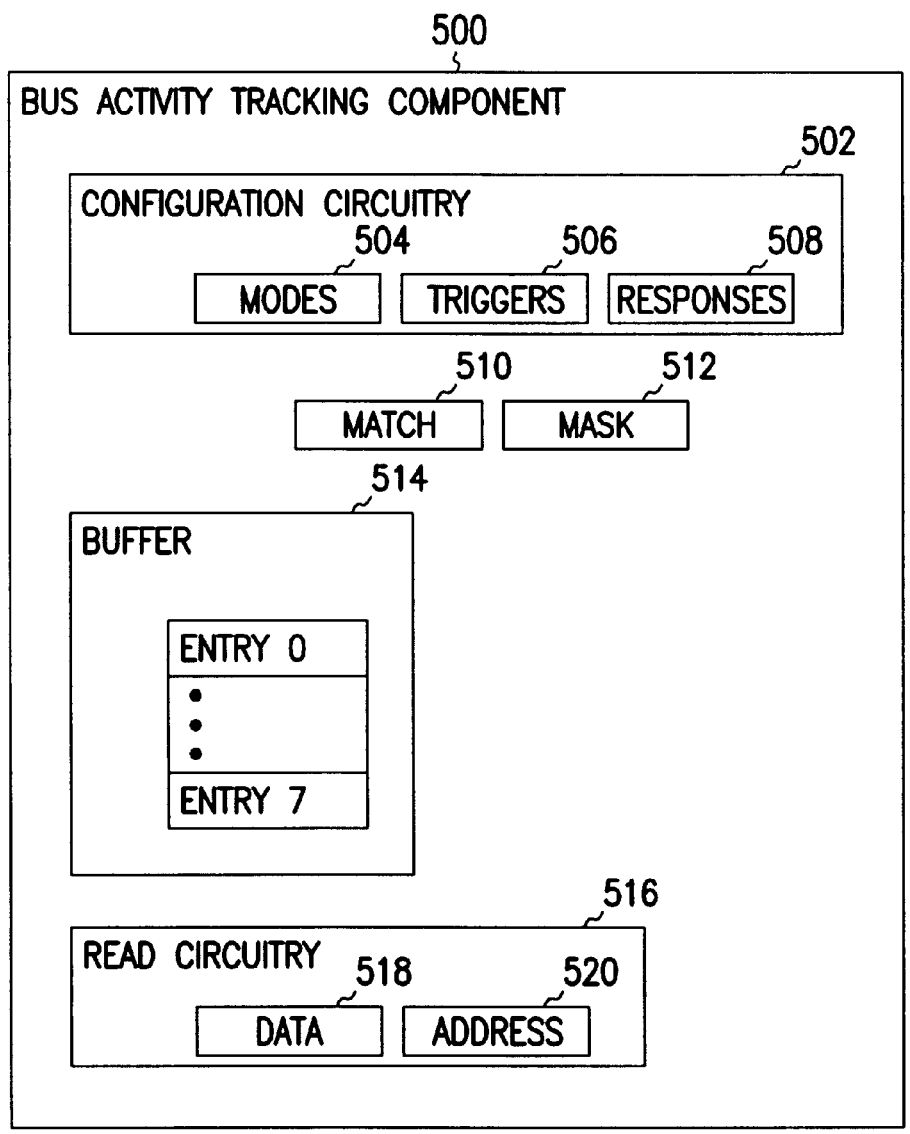
FIG. 5 is a detailed block diagram of an alternate embodiment of a bus activity tracking component.

Many additional features may be combined and added to the features shown in FIG. 4 to create alternate embodiments of a bus activity tracking component 400. FIG. 5 is a block diagram of an alternate embodiment of a bus activity tracking component 500. However, the present invention is not limited to the particular combination of features illustrated in FIG. 5. The alternate embodiment of the bus activity tracking component 500 shown in FIG. 5 comprises configuration circuitry 502, a match register 510, a mask register 512, a buffer 514, and read circuitry 516.

The configuration circuitry 502 identifies one or more modes 504, one or more triggers 506, and one or more responses 508 associated with the triggers 506, as described above.

The match register 510 stores data for one or more of the triggers 506 defined by configuration register 502. The match register 510 is at least large enough to store data representing an address or a micro-operation. Examples of match conditions include, but are not limited to: addresses, micro-operations, combinations of addresses and micro-operations, and other data from bus transactions. The data stored in the match register 506 defines a match condition for one of the triggers 506. Upon satisfaction of the match condition, the bus activity tracking component 500 performs a response 508, such as freezing (also referred to as "locking") the buffer 514. In another example, upon satisfaction of the match condition for the trigger 506, the bus activity tracking component 500 performs operations as defined by the mode 504 set in the configuration register 502 (such as storing bus activity occurring after the trigger). In other words, satisfaction of the match condition for one of the trigger 506 activates the response(s) 508 associated with the trigger 506. In one embodiment, the bus activity tracking component 500 includes any common comparison circuitry to compare bus transactions with the match condition.

To illustrate how the match register 510 works, consider the following examples. In a first example, a system user needs to verify that correct data is written to a particular address. In one embodiment, to verify that a bus transaction writes to a particular address, a trigger 506 is set to activate a response 508 by the bus activity tracking component 500 upon the occurrence of an address match. The particular address is specified in the match register 510 and the address in the match register is used as the match condition for the trigger 506. Upon detection of a bus transaction having an address matching the address in the match register, the match condition is satisfied. When the match condition is satisfied during operation of the bus activity tracking component 500, one response 508 is to store both the data being written and the address where the data was written in the buffer 514.

In a second example, a system user needs to verify the bus transactions associated with a "write" micro-operation conform to a certain bus protocol. In one embodiment, a trigger 506 is set to activate a response 508 by the bus activity tracking component 500, upon the occurrence of the "write" micro-operation in a bus transaction. The "write" micro-operation is specified in the match register 500. The match register 500 is again used as the match condition for the trigger 506. Upon detection of a bus transaction for a "write" micro-operation, the match condition is satisfied. In another embodiment, the match register 510 contains both the address and the write micro-operation. In this case, match condition for the trigger is the occurrence of both the address and the write micro-operation in a bus transaction. When the match condition is satisfied during operation of the bus activity tracking component 500, one response 508 is to store both the micro-operation and the address where the data was being written in the buffer 514. See FIG. 12B, described below, for an example of the contents of a match register, according to one embodiment of the present invention.

The mask register 512 defines mask bits for the match register 510. Mask bits define those bits to ignore in the match register 510. In one embodiment, the match condition is determined by circuitry to merge the match register 510 with the mask bits in the mask register 512. For example, if a user needs to set the match condition as a range of addresses, then the user writes an address to the match register 510 and writes the necessary mask bits to the mask register 512 to create the desired range. In one embodiment, the address in the match register 510 is masked by circuitry in the bus activity tracking component 500 using the mask bits in the mask register 512, resulting in the match condition defined as the range of addresses. See FIG. 12C, described below, for an example of the contents of a match register, according to one embodiment of the present invention.

The buffer 514 stores transactions on a bus according to the configuration circuitry 502 as described above. In FIG. 5, the buffer is circular and has eight entries numbered 0, 1, 2 . . . 7. A compromise was reached with a maximum buffer size of eight for this embodiment, after weighing how many buffer entries it is possible to generate against the cost of each buffer entry as opposed to other uses of that space on the die. However, the embodiments of the present invention are not limited to any maximum buffer size. The size of the buffer is an implementation choice. Embodiments of the present invention are also not limited to any type of buffer; the buffer may be circular or any other type.

In one embodiment, the read circuitry 516 comprises two registers: a data register 518 and an address register 520. Read circuitry 516 reads non-address entries out of the buffer 514 into the data register 518 and reads address entries out of the buffer 514 into the address register 520. In one embodiment, the data register 518 and the address register 520 are accessible by a control bus, that, in turn, is accessible by other on die circuitry or by external debug equipment. In all other respects, the read circuitry is as described above.

Figure 6:
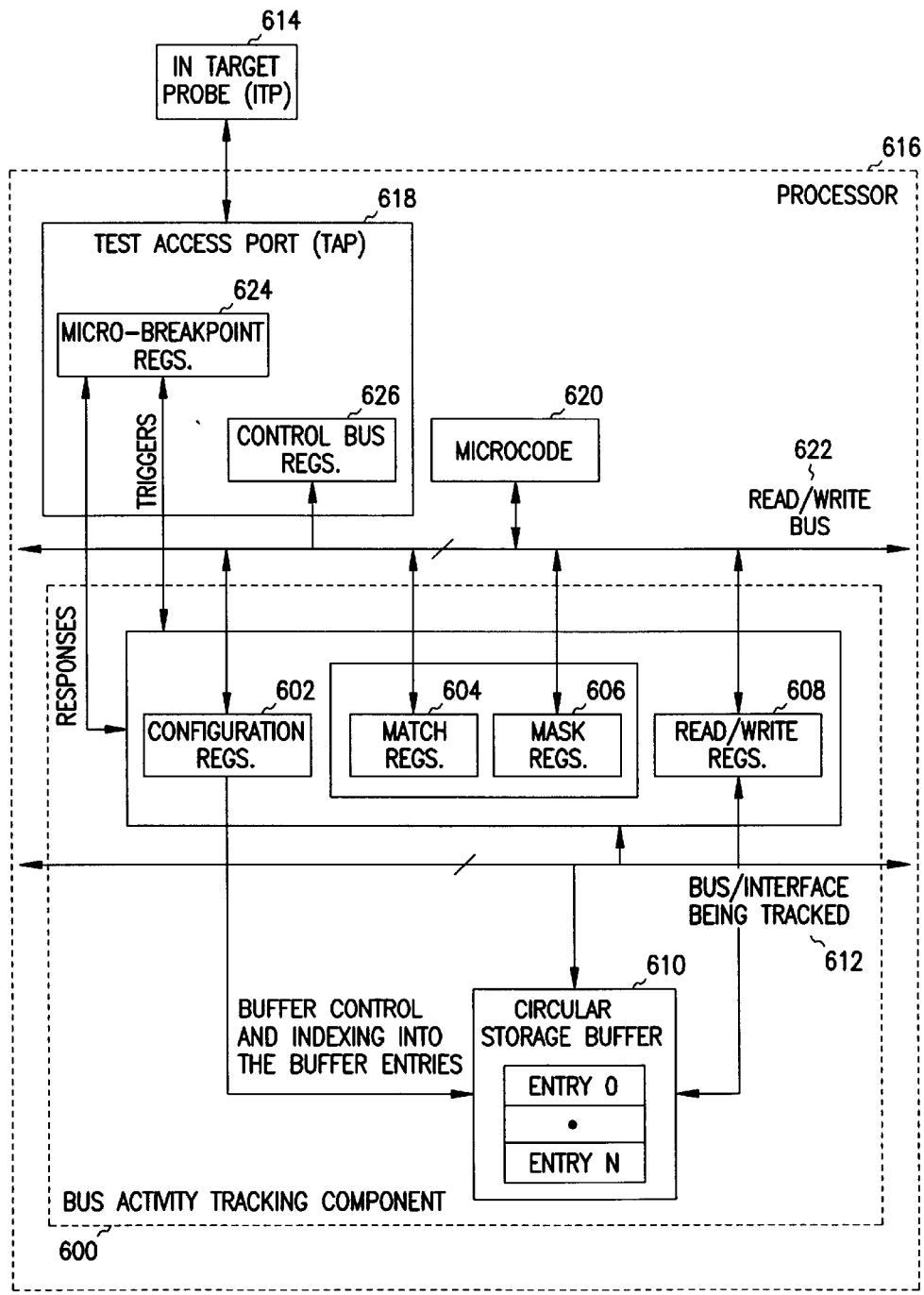
FIG. 6 is a detailed block diagram of an example embodiment of a bus activity tracking component in conjunction with a Test Access Port (TAP), a microcode module, and an In Target Probe (ITP).

FIG. 6 shows an embodiment of a bus activity tracking component 600 similar to the embodiment shown in FIG. 5. The bus activity tracking component 600 comprises configuration registers 602, a match register 604, a mask register 606, a read/write register 608, and a circular storage buffer 610. The bus activity tracking component 600 monitors bus transactions over the bus or interface being tracked 612.

In FIG. 6, the bus activity tracking component 600 is shown in conjunction with an In Target Probe (ITP) 614 which resides outside the processor 616, but is in communication with the processor 616 via a Test Access Port (TAP) 618. For a definition of the TAP circuitry 618, see IEEE Standard 1149.1–1990, IEEE Standard Test Access Port and Boundary-Scan Architecture. This standard defines the TAP circuitry 618, including a standard interface through which instructions and test data are communicated, that may be built into an integrated circuit to assist in test, maintenance, and support of assembled printed circuit boards. Both the TAP 618 and the microcode module 620 can operate the bus activity tracking component 600 by transferring control and data to and from the bus activity tracking component 600 over a read/write bus 622.

The ITP 614 is a debug tool which allows the user to access to on-chip debug features, including, but not limited to, the bus activity tracking component 600, via the TAP 618. The ITP 614 communicates with the processor 616 through the TAP 618 using a system, which is a combination of software and hardware, such as Windows NT 4.0 running on a host Personal Computer (PC) and a Peripheral Component Interconnect (PCI) board in the host PC. The PCI board cable is connected to a set of signals from pin connectors in the TAP 618. The PC drives the data necessary for testing to the input pins of the processor 614 and the output data is monitored by a hardware board in the PC that sends out a signal when the desired test conditions are met. Thus, the processor 616 may be controlled without affecting any high speed signals and the system can operate at full speed with the ITP 614 attached. The primary function of the ITP 614 is to provide a control and query interface to one or more processors 616.

With an ITP 614, a user can control processor registers, system memory, and input-output (I/O) by setting the micro-breakpoint registers 624 and control bus registers 626 and transmitting them over the read/write bus 622 to activate various debug features on the processor, including the bus activity tracking component 600. A user can start and stop a program's execution using a variety of breakpoints, single-step the program at the assembly code level, as well as read and write registers, memory and I/O. The ITP 614 has access to all programmer-visible and non-visible registers in the processor, giving the ITP 614 the necessary control mechanisms to halt the processor, modify its internal state, and resume normal program execution at any chosen instruction boundary.

For example, a user who needs to debug bus transactions over the bus/interface being tracked 612 uses a host PC to debug a target PC or circuit board, where the target PC or circuit board contains the processor 616 under test. An ITP 614 is connected at a first end to the TAP 618 on the processor 616 in the target PC and the ITP is connected at a second end to the host PC. The user runs testing software on the host PC that writes test data to the micro-breakpoint registers 624 and the control bus registers 626 to set up a test scenario. Then the control bus registers 626 direct the data in the micro-breakpoint registers 624 to be transmitted over the read/write bus 622. The micro-breakpoint registers contain the configuration information, comprising the mode identifiers, the trigger identifiers, and the response identifiers for each trigger. The mode, trigger, and response identifiers are transmitted over the read/write bus 622 from the TAP 618 and then stored in the configuration registers 602 in the bus activity tracking component 600. Optionally, the testing software also stores test data to be transmitted from the TAP 618 to the bus activity tracking component 600 to be stored in the match register 604 and mask register 606.

Next in the example, the testing software runs a test satisfying a match condition and activating a trigger and an associated response. The response may optionally include storing one or more bus transactions from the bus or interface being tracked 612 in the circular storage buffer 610. If so, the testing software stores data in the control bus registers 626 that transmits signals over the read/write bus 622. The signals over the read/write bus 622 activate the bus activity tracking component 600 to use the configuration registers 602 to index into the buffer entries and read the test data stored in the buffer 610 out into the read/write register 608. Additionally, the testing software sets the control bus registers 626 in the TAP 618 with directions to read the test data from the read/write register 608 and transmit the test data back over the read/write bus 622 to the TAP 618. If necessary, the software sets the control bus registers 626 repeatedly until all of the buffer entries in the buffer 610 have been read into the read/write register 608 and transmitted over the read/write bus 622 to the TAP 618, using the buffer indexes in the configuration registers 602. Once the output test data is transmitted to the TAP 618, it is transmitted to the ITP 614 and then to the host PC for analysis by the user.

In an alternate embodiment, microcode 620 is used to program and control a bus activity tracking component 600 instead of using an ITP via the TAP. For example, if the system the user is working with does not have an ITP connected, the user can still configure the bus activity tracking component 600 using microcode that can be loaded via the non-TAP pins of the device.

In alternate embodiments, control and programming of the bus activity tracking component 600 is not limited to being performed using the TAP or the microcode. Any mechanism that allows a user to read data from and write data into the configuration register, the match register, or the mask register is contemplated as within the scope of the invention. Furthermore, in alternate embodiments, the bus activity tracking component is configured using a serial connection similar to the manner data is transferred through a shift register. For example, in FIG. 6, the TAP or the microcode are directly connected to the configuration register only. Then, the configuration register is connected to the match register and the match register is connected to the mask register.

Figure 7:
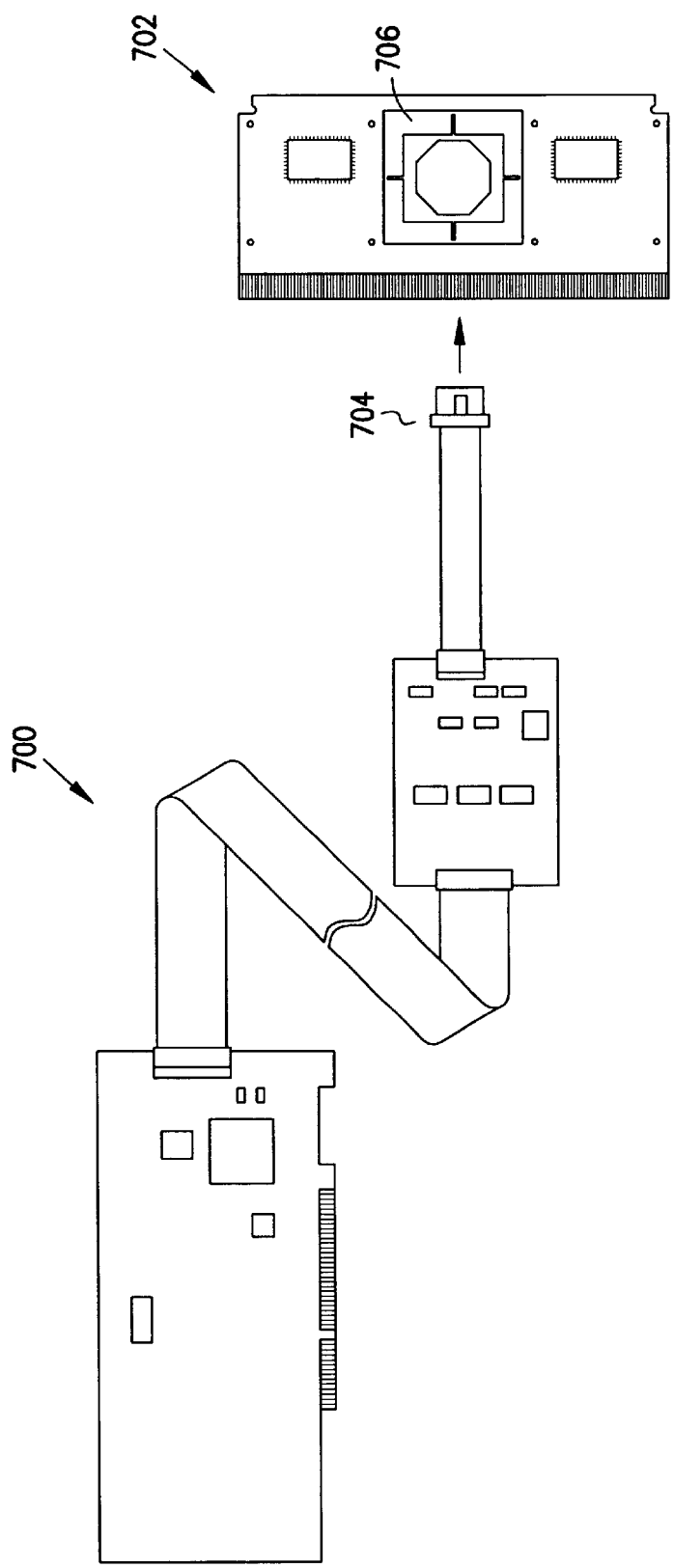
FIG. 7 is a diagram of external debug equipment to be connected to a processor.

FIG. 7 shows external test equipment 700, such as the ITP 614 in FIG. 6, to be connected to an electronic component 702, such as the processor 616 in FIG. 6. External test equipment 700 has a probe 704 that connects with one or more input and output pins 706 on the electronic component 702. The pins 706 give the external test equipment 700 access to some buses, such as the bus or interface being tracked 612 in FIG. 6, among other things. In this embodiment, the electronic component 702 has input and output pins 706 on a package. The package holds at least the die and the die contains at least the following: the configuration circuitry, the buffer, the read circuitry, and the bus being tracked, such as the configuration registers 602 in FIG. 6, the circular storage buffer 610 in FIG. 6, the read/write register 608 in FIG. 6, and the bus/interface being tracked 612 in FIG. 6.

Figure 8:
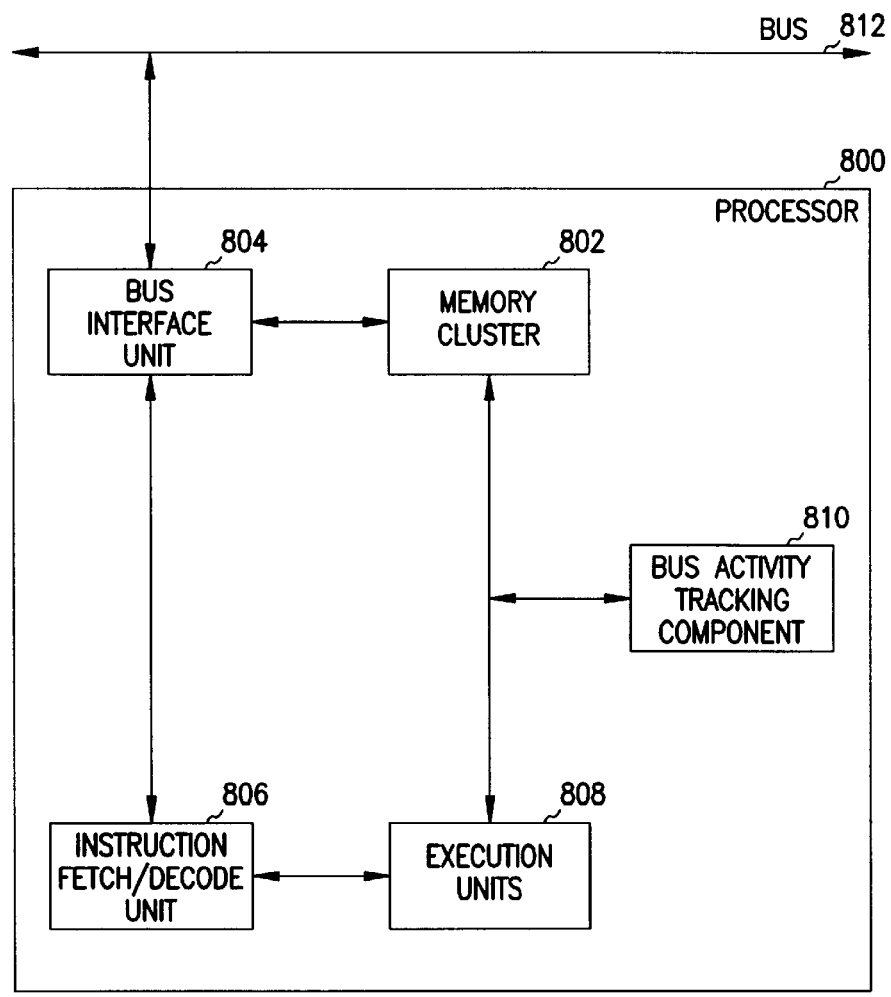
FIG. 8 is a block diagram of an embodiment of a bus activity tracking component to track the interface between a memory cluster and execution units on a processor, according to one embodiment of the present invention.

FIG. 8 is a functional block diagram of an example embodiment of a processor 800 incorporating the bus activity tracking component, such as the bus activity tracking component 400 shown in FIG. 4 or the bus activity tracking component 500 shown in FIG. 5. The example embodiment of the processor 800 comprises a memory cluster 802, a bus interface unit 804, an instruction fetch/decode unit 806, one or more execution units 808 and a bus activity tracking component 810.

The memory cluster 802 provides a memory subsystem for the processor 800 and the bus interface unit 804 provides an interface for operations external to the processor 800. Instructions to be executed and data for processing are supplied over a bus 812 to the bus interface unit 804. The bus interface unit 804 transfers instructions to an instruction fetch and decode unit 806. The instruction fetch and decode unit 806 fetches an instruction from memory or a known storage location and decodes the instruction into one or more operations known as micro-operations. The microoperations are supplied by the instruction fetch and decode unit 806 to an execution unit 808. The execution unit 808 executes the micro-operations. Some of these micro-operations may require reading from or storing to addresses in the memory cluster. Micro-operations involving memory access create transactions on the bus between the execution units 808 and the memory cluster 802 that may be monitored by the bus activity tracking component 810, according to one embodiment of the present invention.

However, the interface monitored by the bus activity tracking component 810 comprises any internal combination of signals or any combination of signals between two devices, either within the same package or between packages. For example, a user who needs to investigate why data at a particular memory address is not stored correctly uses the bus activity tracking device 810 to observe a sequence in time of bus transactions on the bus prior to a critical "write" micro-operation to that memory address. Additionally, a user who needs to verify compliance with a bus protocol, such as Dual Independent Bus (DIP), Industry Standard Architecture (ISA), or Micro Channel, stores several series of bus transactions in a buffer using the bus activity tracking device 810 and then analyze the results.

Figure 9:
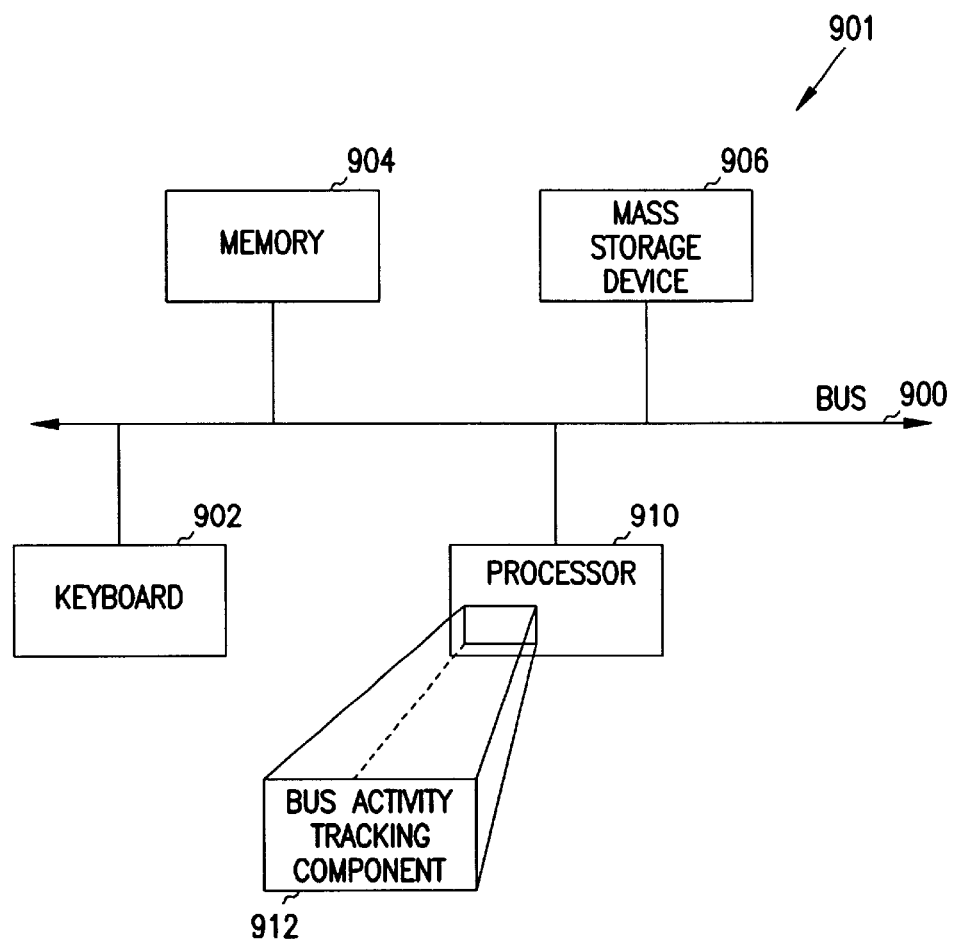
FIG. 9 is a diagram of an embodiment of a bus activity tracking component residing on a processor that is part of a system.

FIG. 9 is a block diagram of a computer system 901, such as a computer system, of an example embodiment of the present invention. The computer system 901 comprises a bus 900, a keyboard interface 902, an external memory 904, a mass storage device 906, and a processor 910. The bus 900, which may be a single bus or a combination of multiple buses, provides communication links between components in the system. The keyboard interface 902, which may be a dedicated device or may reside in another device such as a bus controller or other controller, allows coupling of a keyboard to the system and transmits signals from a keyboard to the system. The external memory 904 may comprise a dynamic random access memory (DRAM) device, a static random access memory (SRAM) device, or other memory devices. The external memory 904 stores information from the mass storage device 906 and the processor 910 for use by the processor 910. The mass storage device 906, which may be a hard disk drive, a floppy disk drive, a CD-ROM device, or a flash memory device or the like, provides information to external memory 904. The processor 910 may be compatible with, but not limited to, processors such as an Intel® architecture processor, manufactured by Intel Corporation of Santa Clara, Calif., the assignee of the present invention. In alternate embodiments, the processor 910 may be compatible with a PowerPC™ architecture processor, an Alpha™ architecture processor, and the like. The processor executes instructions received from the external memory 904 over the bus 900.

In one embodiment, the processor 910 comprises a bus activity tracking component, such as the bus activity tracking component 912 shown in FIG. 9. The bus activity tracking component 912 allows systems designers to view and debug bus traffic in the system environment. In one embodiment, the bus activity tracking component 912 comprises a storage buffer, a set of triggers and a set of responses corresponding to the triggers. The bus activity tracking component 912 is not limited to any one configuration. For example, the bus activity tracking component 912 may be implemented with or without a buffer. Additionally, the bus activity tracking component may be used in cooperation with existing internal debug features and external debug equipment.

Figure 10:
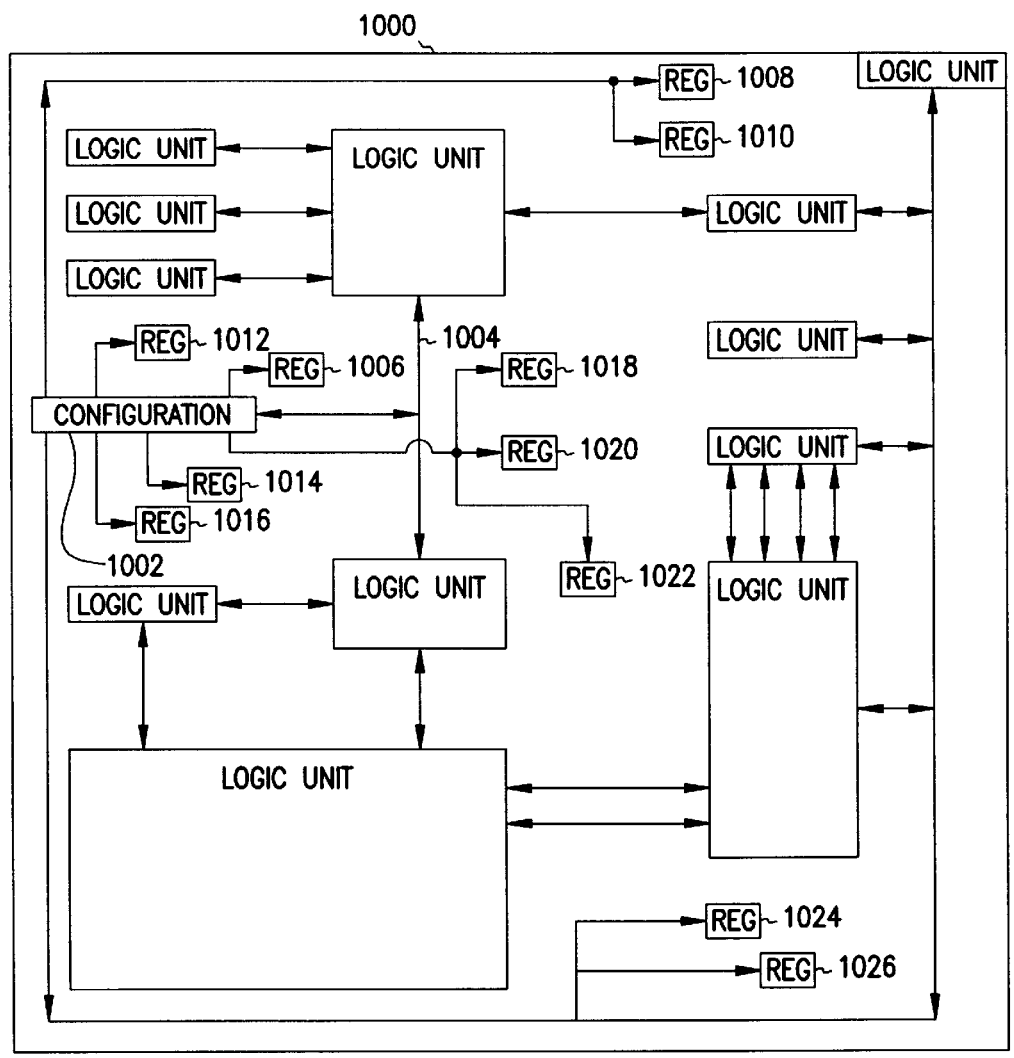
FIG. 10 is a block diagram of a circuit board containing an embodiment of bus activity tracking component.

FIG. 10 shows a die 1000 containing an embodiment of a bus activity tracking component where the bus activity tracking component comprises configuration circuitry 1002 and a plurality of addressable registers placed in otherwise unallocated space on the die 1000. Each of the plurality of registers is directly addressable by a bus accessible to external debug equipment. In one embodiment there are twelve registers as shown in FIG. 10: register 1004, register 1006, register 1008, register 1010, register 1012, register 1014, register 1016, register 1018, register 1020, register 1022, register 1024, and register 1026. The plurality of addressable registers are used to store transactions on the interface being tracked 1004 according to the configuration circuitry 1002 and, in combination, operate as the buffer described above.

Figure 11:
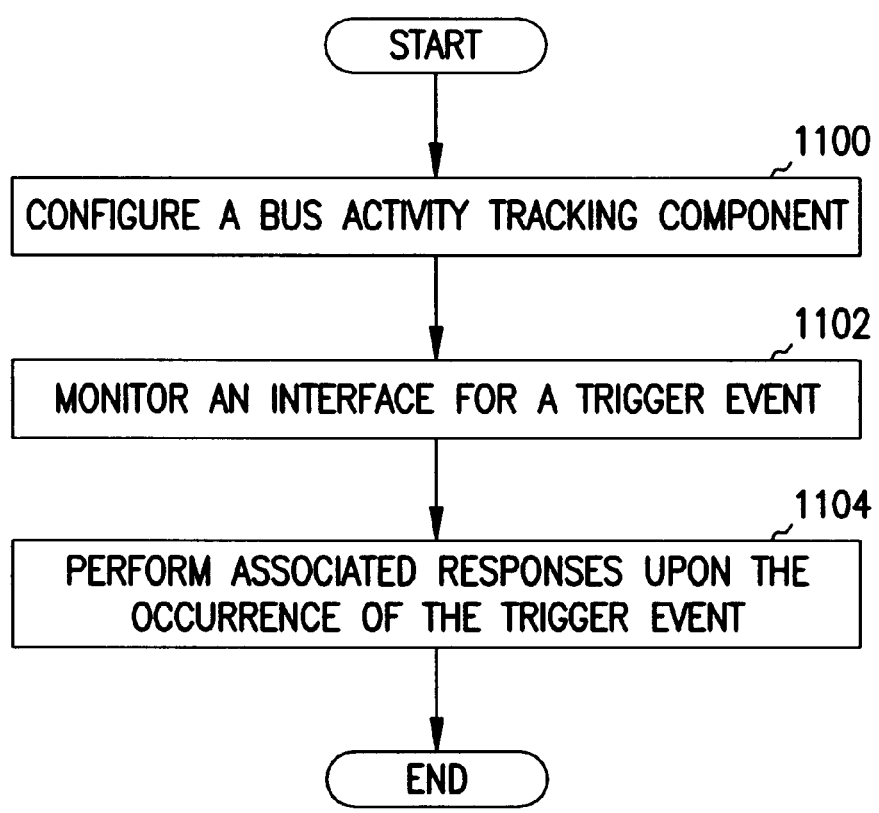
FIG. 11 is a flow chart of an example embodiment of a method for bus activity tracking.

FIG. 11 shows a method of tracking bus activity. The method comprises configuring a bus activity tracking component 1100, monitoring an interface for a trigger event 1102, and performing associated responses upon the occurrence of the trigger event 1104. The bus activity tracking component and the interface being tracked in the method are all located on the same die. In one embodiment, configuring the bus activity tracking component 1100 comprises: storing one or more mode identifiers in a configuration registers; storing one or more trigger identifiers in the configuration register; storing one or more response identifiers for each trigger identifier in the configuration register; and storing one or more addresses in a match register. Monitoring an interface for a trigger event 1102 comprises: monitoring interface signals; comparing interface signals containing addresses to one or more addresses in the match register while ignoring mask bits in a mask register; and comparing interface signals to trigger identifiers.

Various embodiments include one or more of the following optional elements of the method: storing interface signals to a buffer according to configuration circuitry; accessing the stored interface signals; storing one or more operations in the match register; storing address mask bits in a mask register; or enabling the buffer. Accessing the stored interface signals comprises: copying an address from the buffer to a read register; copying data from the buffer to a read register; and transmitting the contents of the read register over an external bus. Another optional feature is to signal external debug equipment in response to a trigger event.

In an example embodiment of the bus activity tracking component described below, the bus activity tracking component is used to view and debug bus traffic between an execution unit and a Level two ("L2") cache which both reside on the same chip. Including the L2 cache on the processor chip precludes the use of a logic analyzer which is typically used to view and debug the back side bus traffic in a system testing lab. The bus activity tracking component's buffer (referred to in this example as a "history buffer") functions as a replacement for this loss of visibility to the L2 interface, thus reducing the risk involved with debugging this interface. According to one embodiment of the invention, the event history buffer provides a "sequence in time" of L2 traffic.

In one embodiment, the history buffer keeps track of the last eight transactions issued to the L2 by monitoring the address and control signals of the interface. The buffer can be frozen based on the occurrence of a trigger condition. A user uses the information stored in the history buffer to recreate the previous eight transactions issued to the L2 prior to a trigger event. Usage of the history buffer in conjunction with a TAP micro-breakpoint mechanism provides additional system debug capability. The default state of this feature is disabled. The user must explicitly enable the feature by writing a control register.

In one embodiment, for each transaction on the bus, the history buffer stores the Address, Cache Commands (CCMD), Cache Way (CWYC), TAG hit/miss, Cache State, Way, Cache Synchronous Error (CSER), Error Correcting Code (ECC) response (meaningful only for data read type transactions), CADS to CADS spacing (in clocks between the current transaction and the previous transaction). CADS stands for cache address strobe.

In this example embodiment, the history buffer is an eight entry deep circular buffer. When data is latched into the eighth entry, a buffer head pointer wraps around and starts filing the history buffer over again. The head pointer points to the next available entry where information about a new transaction issued to the L2 will be stored.

In this example embodiment, the history buffer is accessed by use of five registers residing on a multi-segmented tri-stateable bus: three control registers and two data output registers (used to read the buffer contents out onto the multi-segmented tri-stateable bus). The three control registers, control the modes of the history buffer, the trigger and response conditions and reading the buffer contents out onto the multi-segmented tri-stateable bus. The three control registers used by the history buffer are the configuration register, the match register, and the mask registers. The configuration register defines the mode, trigger, and response operations. The match register defines the address and micro-operation matching conditions and combinations. The mask register defines the address and micro-operation bits from the match register which can be masked. Each of these three registers, along with the data output register, and the buffer are powered up to all zeros. The two output registers (the address register and the data register) are used to read out, respectively, the set of address and miscellaneous data of a history buffer entry selected by bits in the configuration register. A global register (the array freeze register) is used by several units to allow the user to freeze its array by setting to a 1 the associated bit in that register. Writing a 0 to the bit will unfreeze the unit's array. Bit twelve (12) of this register will freeze/unfreeze the history buffer.

FIGS. 12A, 12B, and 12C are tables illustrating contents of configuration register, the match register, and the mask register according to an example embodiment of the invention. FIG. 12A is a table illustrating the contents of an example embodiment of a configuration register. In the example embodiment shown in FIG. 12A, the configuration register is partitioned into five fields. The five fields comprise a mode field 1202, a trigger field 1204, an index field 1206, a response field 1208, and a pointer field 1210.

In one embodiment, the mode field 1202 comprises six bits (0–5). Bit zero (0) is used as a Buffer enable/disable bit. The user explicitly turns on the history buffer by setting bit 0 of the configuration register. This bit is also used to enable the freezing of the buffer as a response to a trigger. This distinguishes responses signaled to the micro-breakpoint mechanism from actually enabling the buffer. In other words, the triggers can all be used to signal a micro-breakpoint without using the history buffer itself.

Bit one (1) determines if the buffer will capture valid L2 micro-operation "events" or log eight clocks of consecutive data. A valid L2 micro-operation "event" is started with the assertion of the CADS. This mode can be used to determine if the data of interest is late by a clock as opposed to just not occurring at all. If bit one (1) is set, the buffer is not wrapped around.

Bit two (2) is used in conjunction with bit one (1) to provide four distinct modes of operation. The modes are described in by reference to configuration bits 2 and 1 indicated as (bit 2, bit 1). When the configuration bits are set to (0,0), the operational mode for the history buffer is to capture eight events before the trigger. When the configuration bits are set to (1,0), the operational mode for the history buffer is to capture eight events after the trigger. When the configuration bits are set to (0,1), the operational mode for the history buffer is to log eight clocks of consecutive data (preferring the BBL signals). When the configuration bits are set to (1,1), the operational mode for the history buffer is to log eight clocks of consecutive data (preferring the L2 signals). Mode (1,0) differs from modes (0,1) and (1,1), except that eight L2 micro-operation "events" are loaded after the trigger, which may occur several clocks apart from each other. If bit three (3) is set, then the CADS-to-CADS counter is incremented once every 4th clock as opposed to the default of every clock, which provides spacing information between the transactions on the interface being monitored. If bit four (4) is set, the history buffer will send out a micro-breakpoint signal on the occurrence of a trigger condition. Note that this feature can be used while the history buffer is disabled. If bit five (5) is set, a TAP micro-breakpoint is signaled every time a trigger condition occurs. If cleared, the breakpoint is signaled only once. It will then be necessary for the use to clear bit four (4) and set it again if another "one-shot" breakpoint signal is desired.

In one embodiment, the trigger field 1204 comprises twelve bits (6–17). When any of bits six through seventeen (6–17) are set, the occurrence of a corresponding event is acknowledged as a trigger condition and a match is signaled. If bit six (6) is set, a match is signaled when an external micro-breakpoint signal is received from the TAP. If bit seven (7) is set, a match is signaled on the occurrence of an ECC error. If bit eight (8) is set, a match is signaled on the occurrence of an L2 error. If bit nine (9) is set, then the address specified in the "match" register will be used as a trigger condition. In one embodiment, selective masking of the address bits is provided by programming "1's" into the "mask" register for the bits that are to be "don't care" on the match. If an L2 transaction is issued that matches the specified address bits excluding the bits that are masked, then a match is signaled. If bit ten (10) is set, a micro-operation specified in the match register will be used as a trigger condition. If an L2 transaction is issued that matches the micro-operation specified, then a match is signaled. If bit eleven (11) is set, then a match is signaled on an L2 Tag Hit indication. If bit twelve (12) is set, then a match is signaled only if the specified address and micro-operation match that of the L2 transaction issued. This is not the same as setting bit nine (9) and bit ten (10), as that will trigger a match if the address OR the micro-operation match that of the L2 transaction issued. Similarly, bit nine (9) and bit ten (10) should be cleared when using bit twelve (12). Bit thirteen (13) is a mode bit for the address and tag hit in the same manner as bit twelve (12) is used for the address and the micro-operation. If bit thirteen (13) is set, then a match is signaled only if the specified address and a Tag Hit match that of the L2 transaction. Bit fourteen (14) is a generic trigger issued by the BBL. This bit allows a trigger for an event or error which occurs in the Back Side Bus Logic (BBL). The BBL issues the micro-operations to the L2. If bit fifteen (15) is set, then a match is signaled immediately, hence the name "user-induced trigger". This is different from having the user freeze the buffer (by writing to bit twenty six (26) of the configuration register or bit 12 of the array freeze register). For instance, the user could be running the user in clock mode, which loads the buffer after the trigger. In the user sets the user-induced trigger, the buffer will not freeze immediately, but it will get the trigger signal necessary to start loading up the buffer. On the other hand, freezing the buffer will immediately stop the buffer from loading. Bit sixteen (16) and bit seventeen (17) are reserved for additional triggers.

In one embodiment, the index field 1206 comprises five bits (18–22). The first three bits (18, 19, 20) of the index field 1206 are used to point to one of the eight history buffer entries to be loaded into the data output registers which are connected to the multi-segmented tri-stateable bus. The two reserved index bits (21, 22) are allocated to increase the index size. If the buffer depth is greater than eight entries, the two reserved bits can be used.

In one embodiment, the response field 1208 comprises four bits (23–26). Three of the bits (23–25) are reserved for later use. If set, bit twenty six (26) indicates that the history buffer is frozen. The history buffer can be unlocked from its frozen state by writing a 0 to this bit, or by writing a 0 to bit 12 of the array freeze control register. Also, the user can freeze the buffer at any time by writing a 1 to either of these registers as indicated. A side affect of writing a 0 to this bit is that the entire buffer is invalidated and the head pointer is reset to position 0.

In one embodiment, the pointer field 1210 comprises five bits (27–31). The first three bits (27, 28, 29) of the pointer field 1210 represent a head pointer. The head pointer is used to locate the last event in the circular history buffer. In one embodiment, the head pointer actually points to the entry after the last stored entry. This pointer is cleared when the buffer is unfrozen. For example, if after enabling the history buffer, there are four L2 transactions that cross the L2 interface and the fourth transaction freezes the history buffer. The four L2 transactions will be logged as entries [0, 1, 2,3]. The head pointer will be pointing to the entry after the last stored entry, which would be [4]. Two reserved counter bits (30, 31) are allocated to increase the counter size. If the buffer depth can be increased beyond eight, these bits can be used.

FIG. 12B is a table illustrating the contents of an example embodiment of a match register. In one embodiment, the match register is a 32 bit register. Bits 0 and 1 are reserved. Bits 2, 3, and 4 represent a micro-operation to be matched. Bits 5–31 represent an address to be matched.

FIG. 12C is a table illustrating the contents of an example embodiment of a mask register. In one embodiment, the mask register is a 32 bit register. Bits 0–4 are reserved. Bits 5–31 represent mask bits for bits of the address to be matched.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What claimed is:

1. A bus activity tracking component comprising:
configuration circuitry to identify one or more modes, one or more triggers, and one or more responses associated with the one or more triggers;
a buffer to store transactions on a bus according to the configuration circuitry;
read circuitry to read data from the buffer;
a first register to store data representing a match condition for at least one of the one or more triggers identified by the configuration circuitry and
a second register to store one or more mask bits for the first register
wherein the configuration circuitry, the buffer, the read circuitry, and the bus are located on a same die.

2. The bus activity tracking component of claim 1 wherein the data represents an address.

3. The bus activity tracking component of claim 1 wherein the data represents a micro-operation.

4. The bus activity tracking component of claim 1 wherein the data represents an address and a micro-operation.

5. The bus activity tracking component of claim 1 wherein the buffer is a circular buffer.

6. The bus activity tracking component of claim 5 wherein the buffer has eight entries.

7. The bus activity tracking component of claim 1 wherein the read circuitry further comprises a data register and an address register.

8. The bus activity tracking component of claim 1 wherein one of the one or more modes indicates buffer enabled.

9. The bus activity tracking component of claim 1 wherein one of the one or more modes indicates buffer disabled.

10. The bus activity tracking component of claim 1 wherein one of the one or more modes indicates data is captured by events.

11. The bus activity tracking component of claim 1 wherein one of the one or more modes indicates data is captured before a trigger.

12. The bus activity tracking component of claim 1 wherein one of the one or more modes indicates data is captured until a trigger occurs.

13. The bus activity tracking component of claim 1 wherein one of the one or more modes indicates data is captured after a trigger.

14. The bus activity tracking component of claim 1 wherein one of the one or more modes indicates to signal internal debug features.

15. The bus activity tracking component of claim 1 wherein one of the one or more modes indicates to signal external debug equipment.

16. The bus activity tracking component of claim 1 wherein the bus is available to a probe connected to one or more input and output pins of a package covering the die.

17. A bus activity tracking component comprising:
configuration circuitry to identify one or more modes, one or more trigers and one or more responses associated with the one or more triggers;
a buffer to store transactions on a bus according to the configuration circuitry; and
read circuitry to read data from the buffer;
wherein the configuration circuitry, the buffer, the read circuitry, and the bus are located on a same die and wherein one of the one or more modes indicates data is captured by consecutive clocks.

18. A bus activity tracking component comprising:
configuration circuitry to identify one or more modes, one or more triggers, and one or more responses associated with the one or more triggers;
a buffer to store transactions on a bus according to the configuration circuitry; and
read circuitry to read data from the buffer;
wherein the configuration circuitry the buffer, the read circuitry, and the bus are located on a same die and wherein one of the one or more modes indicates an amount of data to capture.

19. A debugging system comprising:
a die;
an interface on the die to track; and
an interface activity tracking component comprising:
a configuration circuit formed on the die to identify one or more modes, one or more triggers, and one or more responses associated with the triggers;
a buffer formed on the die to store transactions on the interface according to the configuration circuitry;
a read circuit formed on the die to read data out of the buffer;
a first register formed on the die to store data representing a match condition for at least one of the one or more triggers identified by the configuration circuitry; and
a second register formed on the die to store one or more mask bits for the first register.

20. The debugging system of claim 19 further comprising a bus on the die to write control signals and data to and from the interface activity tracking component.

21. The debugging system of claim 19 further comprising a test access port to communicatively couple external debug equipment to the interface activity tracking component.

22. A processor comprising:
a plurality of logic units;
a plurality of interfaces to communicatively couple the logic units;
interface activity tracking circuitry to monitor signals on one of the interfaces between two of the logic units; and
a plurality of addressable registers to store a sequence of signals over a period of time on the interface monitored by the interface activity tracking circuitry wherein the interface activity tracking circuitry monitors data on one of the interfaces between a cache and an execution unit.

23. The processor of claim 22 wherein the cache is a L2 cache.

24. A processor comprising:
a plurality of logic units;
a plurality of interfaces to communicatively couple the logic units;
interface activity tracking circuitry which is part of a bus interface unit to monitor signals on one of the interfaces between two of the logic units; and
a plurality of addressable registers to store a sequence of signals over a period of time on the interface monitored by the interface activity tracking circuitry.

25. A computerized system comprising:
a first bus;
an external memory to store instructions for execution by a processor; and
a processor coupled to the memory by the first bus, the processor to execute instructions received from the memory over the first bus, the processor comprising:
at least two logic units coupled by a second bus; and
a bus activity tracking component to detect and debug failures on the second bus and to store a sequence in time of traffic on the bus between a cache and an execution unit.

26. The computerized system of claim 25 wherein the cache is a L2 cache.

27. A method of tracking a bus activity comprising:
configuring a bus activity tracking component comprising;
storing one or more mode identifiers in a configuration register;
storing one or more trigger identifiers in the configuration register;
storing one or more response identifiers for each trigger identifier in the configuration register; and
storing one or more addresses in a match register;
storing address mask bits in a mask register;
monitoring an interface for a trigger event; and
performing associated responses upon the occurrence of the trigger event;
wherein the bus activity tracking component and the interface are located on the same die.

28. The method of claim 27 further comprising storing interface signals to a buffer according to configuration circuitry.

29. The method of claim 27 further comprising storing one or more operations in the match register.

30. The method of claim 27 further comprising enabling a buffer.

31. The method of claim 27 wherein the trigger event is a micro-operation .

32. The method of claim 27 wherein the trigger event is a signal from external debug equipment.

33. The method of claim 27 wherein the trigger event is a hardware component error signal.

34. A method of tracking a bus activity comprising:
configuring a bus activity tracking component comprising:
storing one or more mode identifiers in a configuration register;
storing one or more trigger identifiers in the configuration register;
storing one or more response identifiers for each trigger identifier in the configuration register; and
storing one or more addresses in a match register;
monitoring an interface for an interface error signal, and
performing associated responses upon the occurrence of the interface error signal;
wherein the bus activity tracking component and the interface are located on the same die.

35. A method of tracking a bus activity comprising:
configuring a bus activity tracking component comprising:

storing one or more mode identifiers in a configuration register;

storing one or more trigger identifiers in the configuration register;

storing one or more response identifiers for each trigger identifier in the configuration resister; and storing one or more addresses in a match register;

monitoring an interface for a cache hit; and performing associated responses upon the occurrence of the cache hit;

wherein the bus activity tracking component and the interface are located on the same die.

36. A method of tracking a bus activity comprising:

configuring a bus activity tracking component comprsing;

storing one or more mode identifiers in a configuration register;

storing one or more trigger identifiers in the configuration register;

storing one or more response identifiers for each trigger identifier in the configuration register; and storing one or more addresses in a match register; monitoring an interface for a cache miss; and performing associated responses upon the occurrence of the cache miss;

wherein the bus activity tracking component and the interface are located on the same die.

37. The method of claim 27 wherein the trigger event is a user-induced trigger.

38. A method of tracking a bus activity comprising:

configuring a bus activity tracking component comprising;

storing one or more mode identifiers in a configuration register;

storing one or more trigger identifiers in the configuration register;

storing one or more response identifiers for each trigger identifier in the configuration register; and storing one or more addresses in a match register; monitoring an interface for is an error correcting code error; and performing associated responses upon the occurrence of the error correcting code error;

wherein the bus activity tracking component and the interface are located on the same die.

* * * * *

UNITED STATES PATENT AND TRADEMARK OFFICE
CERTIFICATE OF CORRECTION

PATENT NO. : 6,792,563 B1
DATED : September 14, 2004
INVENTOR(S) : DesRosier et al.

It is certified that error appears in the above-identified patent and that said Letters Patent is hereby corrected as shown below:

Column 15,
Line 3, delete "trigers" and insert -- triggers, --, therefor.

Column 16,
Line 30, delete ";" and insert -- : --, therefor.
Line 44, delete "micro-operation ." and insert -- micro-operation. --, therefor.
Line 51, delete ":" and insert -- ; --, therefor.
Line 67, delete ":" and insert -- ; --, therefor.

Column 17,
Line 6, delete "resister" and insert -- register --, therefor.
Line 15, delete "comprsing" and insert -- comprising --, therefor.

Signed and Sealed this

Twenty-eighth Day of December, 2004

JON W. DUDAS
*Director of the United States Patent and Trademark Office*